(12) United States Patent
Kao

(10) Patent No.: US 10,241,594 B2
(45) Date of Patent: Mar. 26, 2019

(54) MOUSE WITH ADJUSTABLE SENSING MODULE

(71) Applicant: Tsung-Ching Kao, New Taipei (TW)

(72) Inventor: Tsung-Ching Kao, New Taipei (TW)

( * ) Notice: Subject to any disclaimer, the term of this patent is extended or adjusted under 35 U.S.C. 154(b) by 472 days.

(21) Appl. No.: 15/195,127

(22) Filed: Jun. 28, 2016

(65) Prior Publication Data
US 2017/0371436 A1 Dec. 28, 2017

(51) Int. Cl.
*G06F 3/0354* (2013.01)
*G06F 3/03* (2006.01)

(52) U.S. Cl.
CPC ........ *G06F 3/03543* (2013.01); *G06F 3/0317* (2013.01)

(58) Field of Classification Search
None
See application file for complete search history.

(56) References Cited

U.S. PATENT DOCUMENTS

| | | | |
|---|---|---|---|
| 6,788,875 B1 * | 9/2004 | Bidiville | G06F 3/0317 250/221 |
| 7,084,856 B2 * | 8/2006 | Huppi | G06F 3/03543 345/156 |
| 8,850,093 B2 | 9/2014 | Chang | |
| 2002/0060663 A1 * | 5/2002 | Wang | G06F 3/0312 345/156 |
| 2008/0042041 A1 * | 2/2008 | Cheah | G06F 3/0317 250/201.1 |
| 2008/0111791 A1 * | 5/2008 | Nikittin | G06F 3/016 345/163 |
| 2014/0215105 A1 * | 7/2014 | Chang | G06F 3/0317 710/62 |
| 2016/0109964 A1 * | 4/2016 | Wang | G06F 3/03543 345/166 |
| 2018/0210565 A1 * | 7/2018 | Chang | G06F 3/0383 |
| 2018/0275778 A1 * | 9/2018 | Zhang | G06F 3/0317 |

* cited by examiner

*Primary Examiner* — Srilakshmi K Kumar
*Assistant Examiner* — Karin Kiyabu
(74) *Attorney, Agent, or Firm* — Muncy, Geissler, Olds & Lowe, P.C.

(57) ABSTRACT

A mouse with an adjustable sensing module is revealed. The mouse includes a mouse body with a round opening on a bottom surface thereof, a rotatable outer ring set on the round opening of the mouse body, a rotatable inner ring mounted in the outer ring, and a disk having a sensing module and vertically moveable in the inner ring. The disk is driven to move vertically relative to the inner ring for adjusting height of the sensing module relative to the working surface when the inner ring is rotated an angle clockwise or counterclockwise relative to the outer ring. The angle of the sensing module relative to a computer screen is adjusted when the outer ring is rotated an angle relative to the round opening of the mouse body and the inner ring together with the disk is rotated the angle along with the outer ring.

9 Claims, 7 Drawing Sheets

MOUSE WITH ADJUSTABLE SENSING MODULE

BACKGROUND OF THE INVENTION

The present invention relates to a mouse, especially to a mouse with an adjustable sensing module, allowing users to adjust a 1-dimensional height (Z-axis) of the sensing module relative to a working surface, or a 2-dimensional angle (X-Y axis) of the sensing module relative to a computer screen easily.

The mouse is one of essential peripherals of computers. In recent years, the mouse is applied to computer games. It's operated on s working surface to execute various functions of the computer such as input coordinates, click the object, vertically or horizontally scroll the screen, etc. There are various kinds of working surface such as mouse pads with different paint coatings, plastic surface, wood surface, etc. Thus the LOD (lift off distance) of the sensor used in the mouse is affected by the working surface. Most of the sensor of general mouse or specific mouse for computer games is set and assembled at the manufacturing end. When consumers (user end) select and use the mouse, the LOD of the mouse is limited or reduced by the working surface made from different materials. The users are unable to adjust or improve the phenomenon by themselves unless related software is applied. In order to solve the above shortcoming, the mouse revealed in the U.S. Pat. No. 8,850,093 "MOUSE WITH A REPLACEABLE SENSING UNIT" is provided. Users can select a suitable sensing unit according to their needs and set the sensing unit in a preset receiving slot of a main body of the mouse. The sensing unit is formed by different sensing components or their combinations such as yellow/red light sensor, blue light sensor, infrared light sensor, laser sensor, etc. However, in practice, the mouse revealed should be used in combination with different types of sensor. The production cost (at least the cost of the sensor) and the purchase cost are increased. Moreover, such mouse is not necessary for consumers. They have other options. Thus the market acceptance of the mouse is not growing.

When the computer mouse is operated on a working surface, a direction toward a front end of the mouse is defined as Y axis (refer to FIG. 1 and FIG. 2), facing a computer screen (not shown in figures). That means the Y-axis of the mouse is facing the computer screen and parallel to the normal line of the computer screen. The cursor on the screen shows movement/locations of the mouse when the mouse is moved on a working surface (2-dimensional movement along X-Y axes). However, each individual has different operating modes. The most common is that the Y-axis of the mouse is not aligned with the computer screen, without being parallel with the normal line of the computer screen. There is a certain angle between the Y-axis of the mouse and the normal line of the computer screen. Thus the movement of the mouse in 2-dimension on the working surface is not displayed on the computer screen synchronously and correspondingly. The mouse can't meet the requirements of computer game players for fast and precise movements.

SUMMARY OF THE INVENTION

Therefore it is a primary object of the present invention to provide a mouse with an adjustable sensing module, which allow users to adjust a 1-dimensional height (Z-axis) of the sensing module relative to the working surface, or a 2-dimensional angle (X-Y axis) of the sensing module relative to the computer screen easily. The sensing module can be adjusted in one-dimensional, 2-dimensional (X-Y) or 3-dimensional (X-Y-Z) mode.

In order to achieve the above object, a mouse with an adjustable sensing module according to the present invention includes a mouse body with a round opening on a bottom surface thereof, an outer ring set on the round opening of the mouse body and able to be rotated horizontally, an inner ring mounted in the outer ring and able to be rotated horizontally, and a disk vertically moveable in the inner ring. The disk is disposed with a sensing module and a sensing window. When the inner ring is rotated an angle clockwise or counterclockwise relative to the outer ring and the outer ring remains stationary, the disk is driven by the inner ring to move vertically relative to the inner ring for adjustment of one-dimensional height (Z axis) of the sensing module relative to the working surface. The 2-dimensional angle (X-Y axis) of the sensing module and the sensing window relative to a computer screen is adjusted when the outer ring is rotated an angle relative to the round opening and the inner ring together with the disk is rotated the angle along with the outer ring synchronously. Thereby the sensing module of the mouse can be adjusted in different modes.

The mouse with the adjustable sensing module is operated on a working surface. The mouse body is disposed with a mouse circuit for executing functions of the mouse and a round opening on the bottom surface thereof. The outer ring with a central hole is set on the round opening of the mouse body and rotatable relative to the round opening. The inner ring having a central hole is arranged at and rotatable in the central hole of the outer ring. The disk is mounted in and vertically moveable in the central hole of the inner ring. The disk is vertically moved relative to the inner ring to change the height of the disk relative to the inner ring when the inner ring is rotated clockwise or counterclockwise relative to the outer ring horizontally. The sensing module is arranged at an inner surface of the disk (facing the round opening of the mouse body) and is electrically connected to the mouse circuit in the mouse body. The sensing window corresponding to the sensing module is set on a surface of the disk. The sensing module detects the working surface with the mouse through the sensing window. The mouse circuit further gets an input signal generated by the sensing module that detects the movement of the mouse body on the working surface. Then the mouse circuit outputs a cursor control signal correspondingly to a computer. The sensing module and the sensing window of the disk is integrally driven by the inner ring to move vertically relative to the inner ring for changing the height of the sensing module relative to the inner ring/or the working surface when the outer ring remains still and the inner ring is rotated an angle clockwise or counterclockwise relative to the outer ring. The lift off distance (LOD) of the mouse is adjusted for improving the height (Z axis) of the mouse in use. The sensing window and the sensing module on the disk and the inner ring are integrally rotated an angle synchronously with the outer ring when the outer ring is rotated the angle relative to the round opening on the bottom surface of the mouse body. That means the angle of the mouse in use is adjusted.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
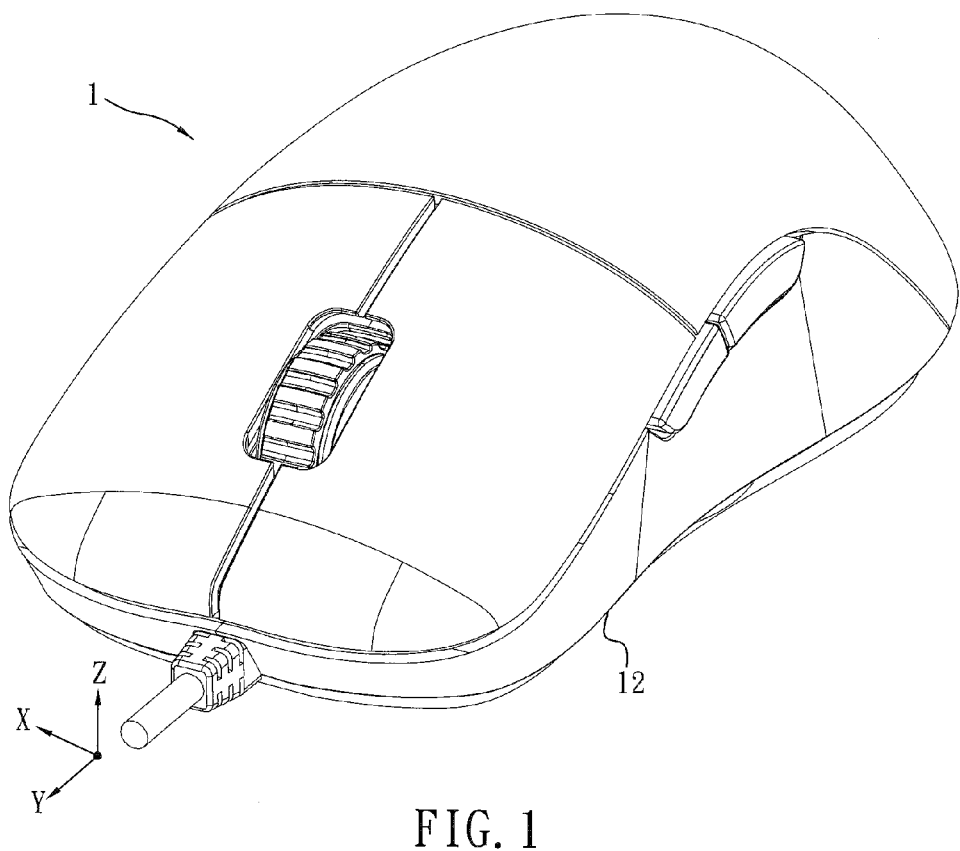
FIG. 1 is a perspective view of an embodiment according to the present invention.
Figure 2:
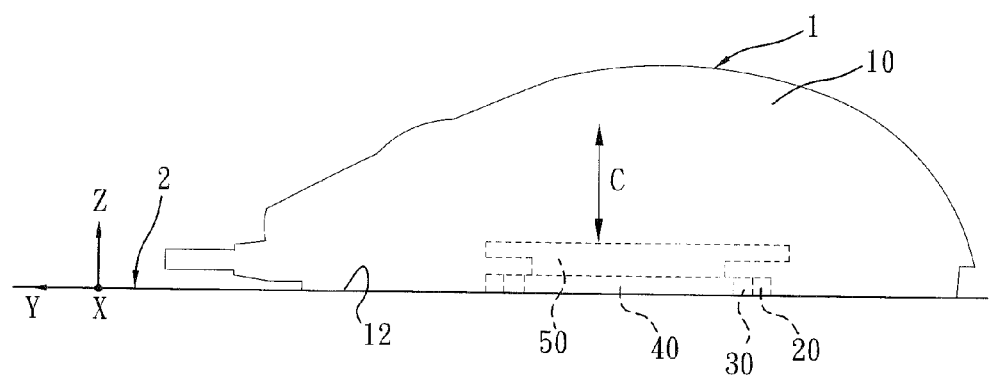
FIG. 2 is a side view of the embodiment in FIG. 1 on a working surface according to the present invention.
Figure 4:
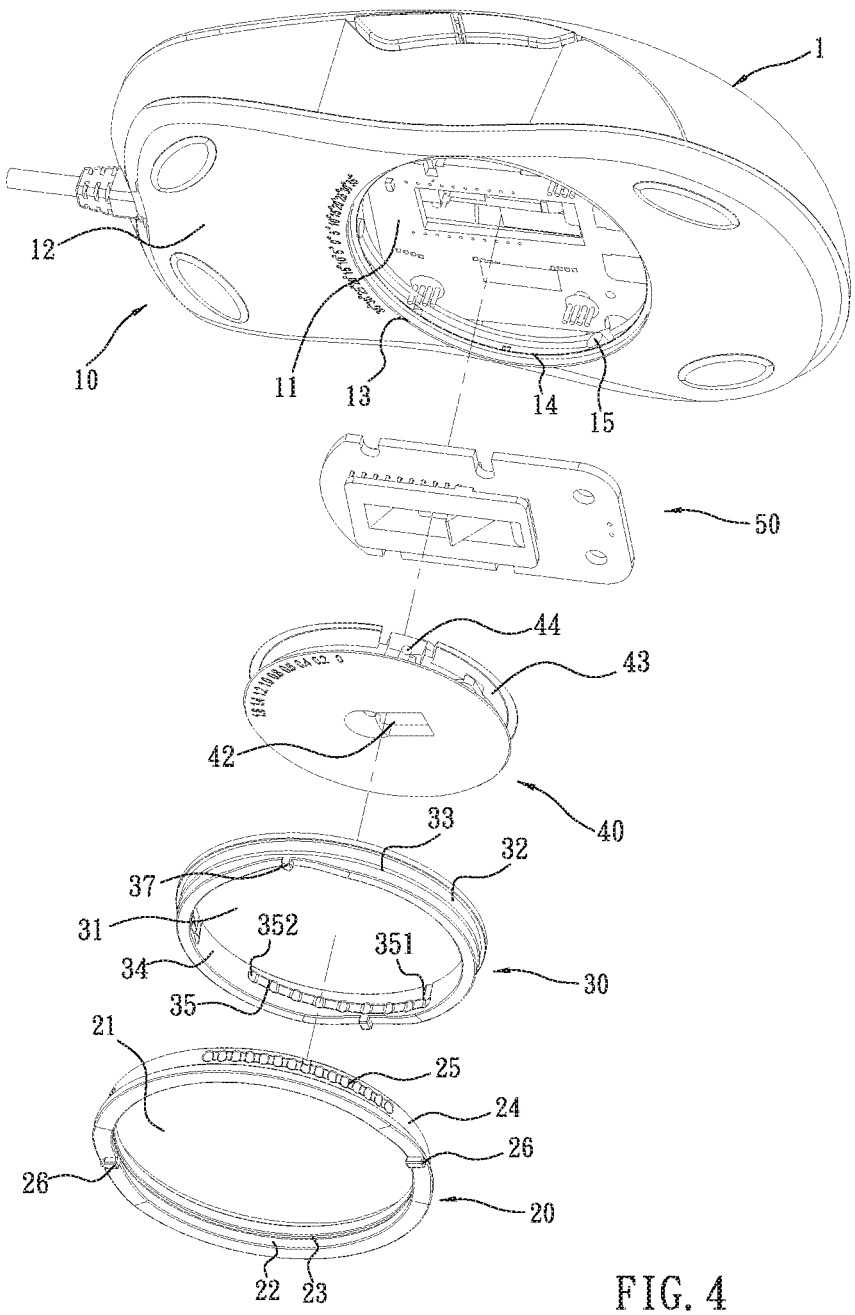
FIG. 4 is an explosive view viewed from a bottom of the embodiment in FIG. 1 according to the present invention.

Refer to FIG. 1, FIG. 2 and FIG. 4, a mouse with an adjustable sensing module 1 according to the present invention is operated on a working surface 2 and including a mouse body 10, an outer ring 20, an inner ring 30, a disk 40 and a sensing module 50.

Refer to FIG. 4, a mouse circuit 11 is mounted in the mouse body 10 and used for executing functions of the mouse 1 with a sensing module. A round opening 13 is disposed on a bottom surface 12 of the mouse body 10.

The outer ring 20 is arranged with a penetrating central hole 21 and is set on the round opening 13 of the mouse body 10. The outer ring 20 is able to be rotated relative to the round opening 13 horizontally, as the arrow A in FIG. 3 indicates.

Still refer to the FIG. 4, the inner ring 30 includes a penetrating central hole 31 and is set on the central hole 21 of the outer ring 20, able to be rotated horizontally. A guiding slot 23 is disposed around an inner circular surface 22 of the outer ring 20 while a guiding protrusion 33 is arranged around an outer circular surface 32 of the inner ring 30. The guiding protrusion 33 is mounted in and sliding horizontally in the guiding slot 23 of the outer ring 20, as the arrow B in FIG. 3 indicates.

The disk 40 is mounted in and vertically moveable in the central hole 31 of the inner ring 30. When the inner ring 30 is rotated clockwise or counterclockwise relative to the outer ring 20 (as the arrow B in FIG. 3 indicates), the disk 40 is moved vertically (as the arrow C in FIG. 2 and FIG. 7 indicates) relative to the inner ring 30, without rotation. Thus the height of the disk 40 relative to the central hole 31 of the inner ring 30 is changed or adjusted. Moreover, a surface of the disk 40 is set with a sensing window 42.

Figure 5:
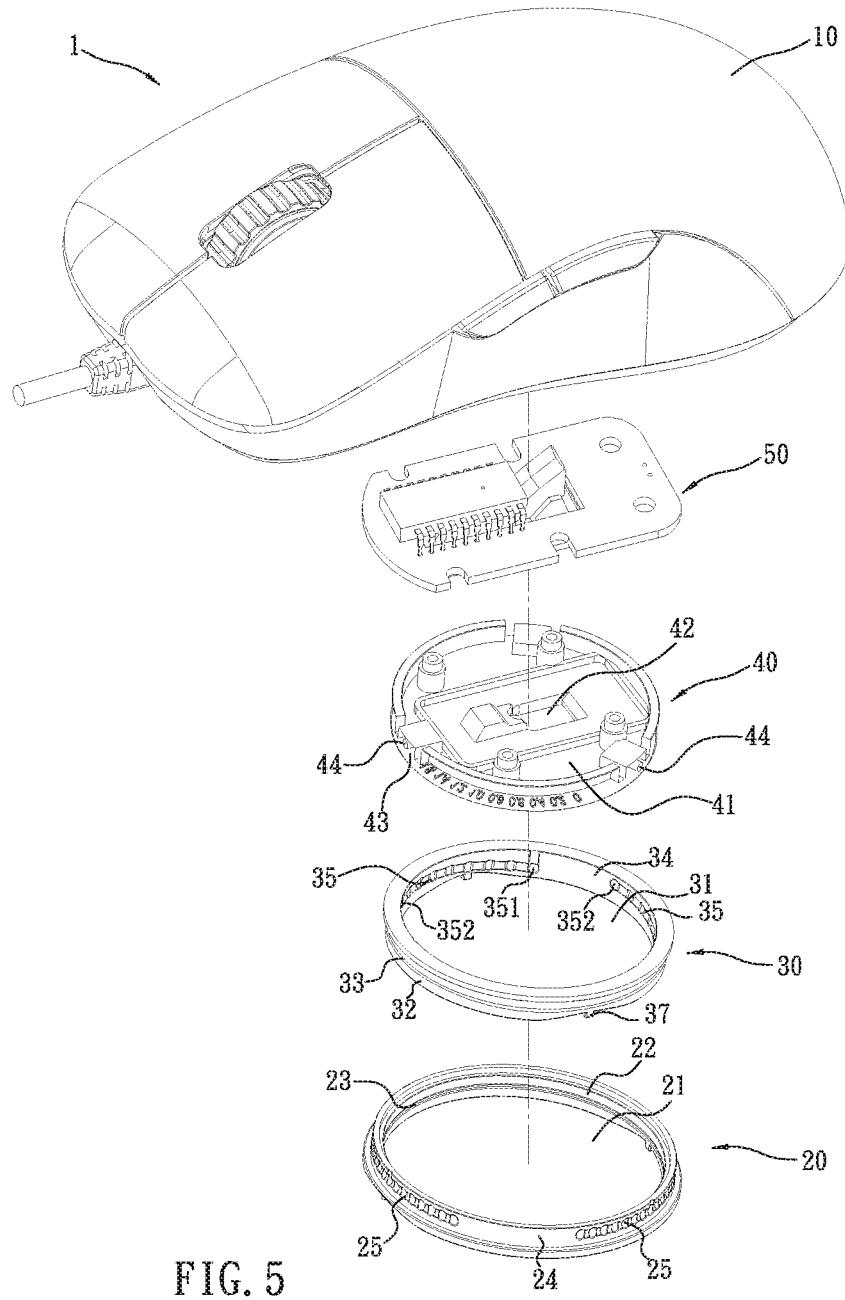
FIG. 5 is an explosive view of the embodiment in FIG. 4 from another angle of view (top view) according to the present invention.

Refer to FIG. 4 and FIG. 5, the sensing module 50 is arranged at an inner surface 41 of the disk 40 (facing the round opening 13). The sensing module 50 is electrically connected to the mouse circuit 11 in the mouse body 10 so that the mouse circuit 11 obtains an input signal from the sensing module 50 that detects the movement of the mouse body 10 on the working surface 2 through the sensing window 42. Then the mouse circuit 11 outputs a cursor control signal correspondingly to a computer (not shown in the figure).

Figure 3:
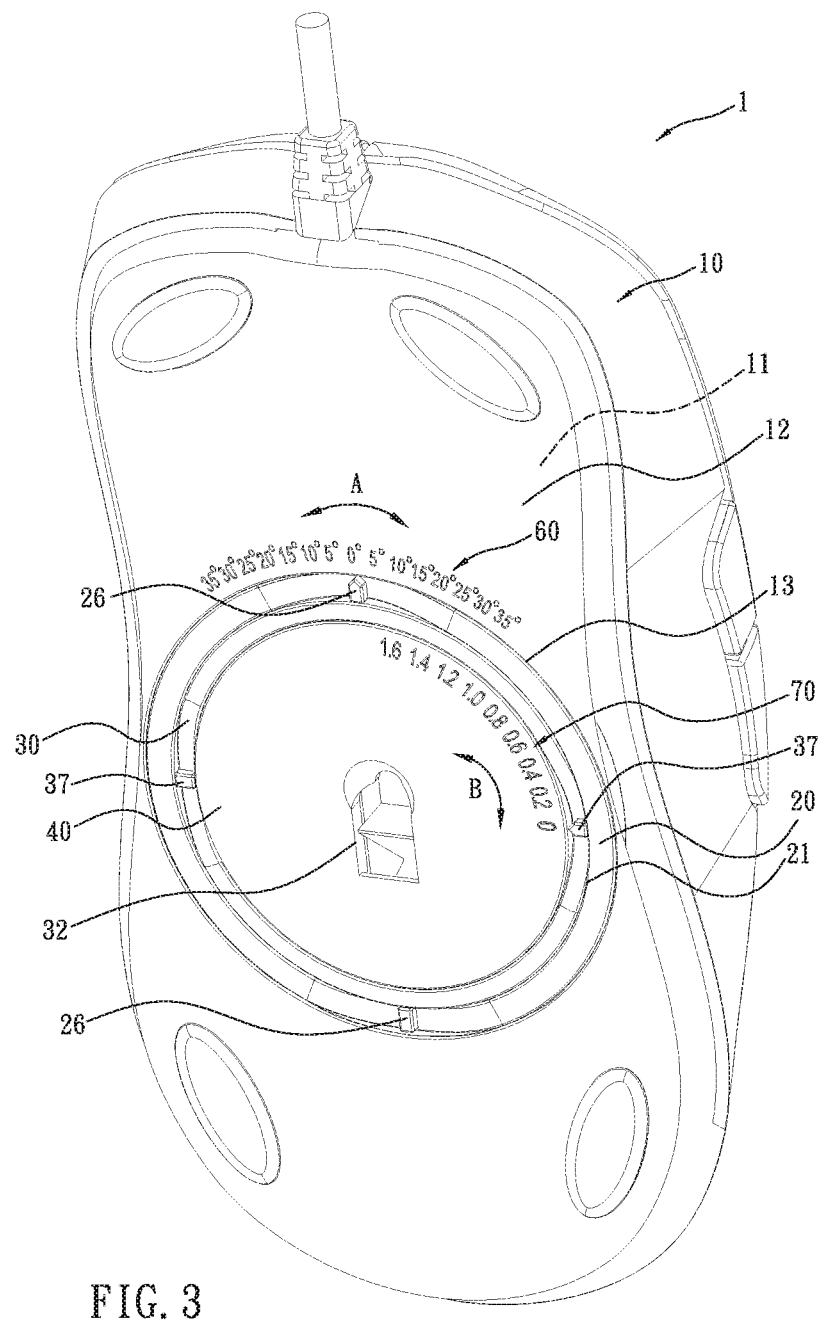
FIG. 3 is a bottom view of the embodiment in FIG. 1 according to the present invention.

As the arrow A in FIG. 3 indicates, the inner ring 30 and the disk 40 are rotated the angle along with the outer ring 20 synchronously when the outer ring 20 is operated to horizontally rotate an angle relative to the round opening 13 of the mouse body 10. Thereby the 2-dimensional angle of both the sensing module 50 and the sensing window 42 relative to a computer screen (not shown in figure) is adjusted, as shown in FIG. 1 and FIG. 2.

The disk 40 is moved vertically relative to the inner ring 30, without rotation when the inner ring 30 is rotated clockwise or counterclockwise relative to the outer ring 20, as the arrow B in FIG. 3 indicates. Thus the sensing module 50 and the sensing window 42 are moved vertically (the Z axis) along with the disk 40 relative to the inner ring 30, as the arrow C in FIG. 2 and FIG. 7 indicates. Thereby the height of the sensing module 50 relative to the inner ring 30 or the working surface 2 is changed. The lift off distance (LOD) of the mouse 1 is adjusted for improving the height of the mouse 1 in use.

At least one outer sliding groove 25 with a central angle is disposed around an outer circular surface 24 of the outer ring 20. In this embodiment, there are three outer sliding grooves 25 disposed with an equal interval between the two adjacent outer sliding grooves, as shown in FIG. 5 (only two outer sliding grooves 25 are shown owing to the viewing angle). At least one pin 15 is arranged at an inner circular surface 14 of the round opening 13 of the mouse body 10. In this embodiment, there are three pins 15 arranged with an equal interval therebetween (only two pins 15 are shown owing to the viewing angle) as shown in FIG. 4. The pins 15 are mounted and moveable in the outer sliding grooves 25 of the outer ring 20 correspondingly. Thereby the outer ring 20 is able to be rotated an angle in relative to the round opening 13 of the mouse body 10 horizontally and the angle of the outer ring 20 being rotated is within the central angle of the outer sliding groove 25.

Figure 6:
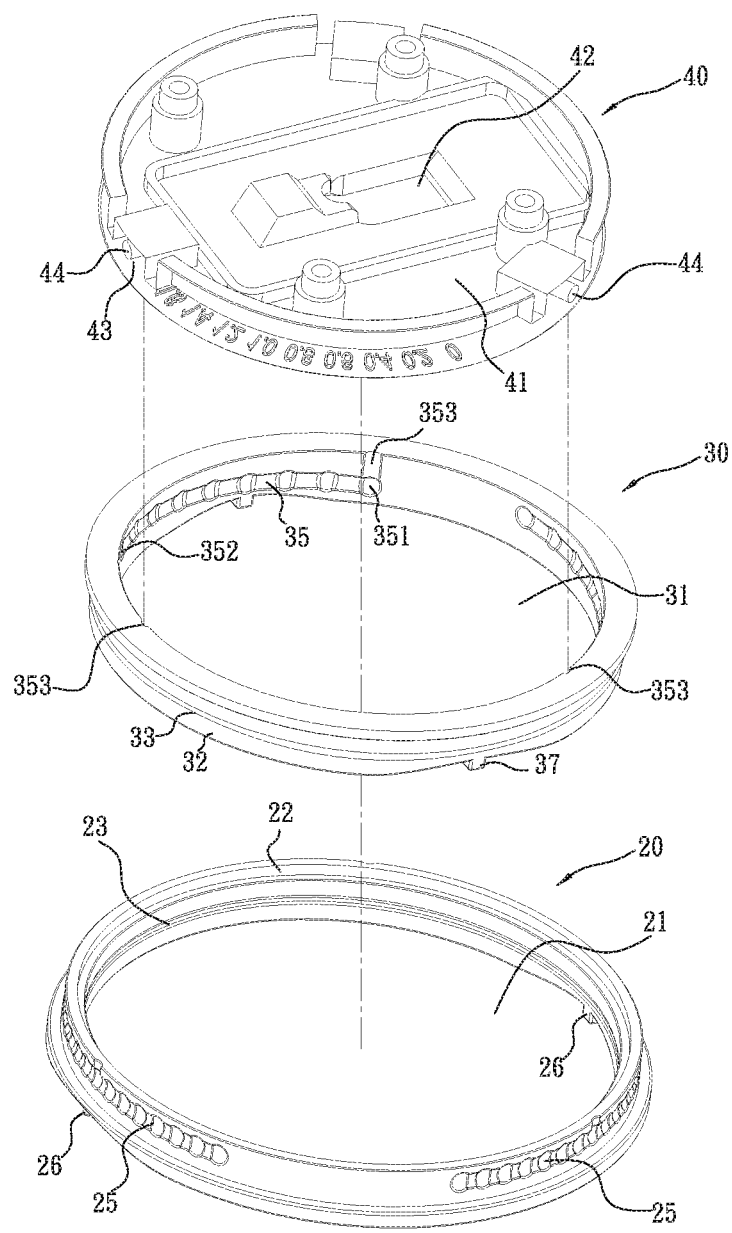
FIG. 6 is an explosive view of an outer ring, an inner ring and a disk of an embodiment according to the present invention.
Figure 7:
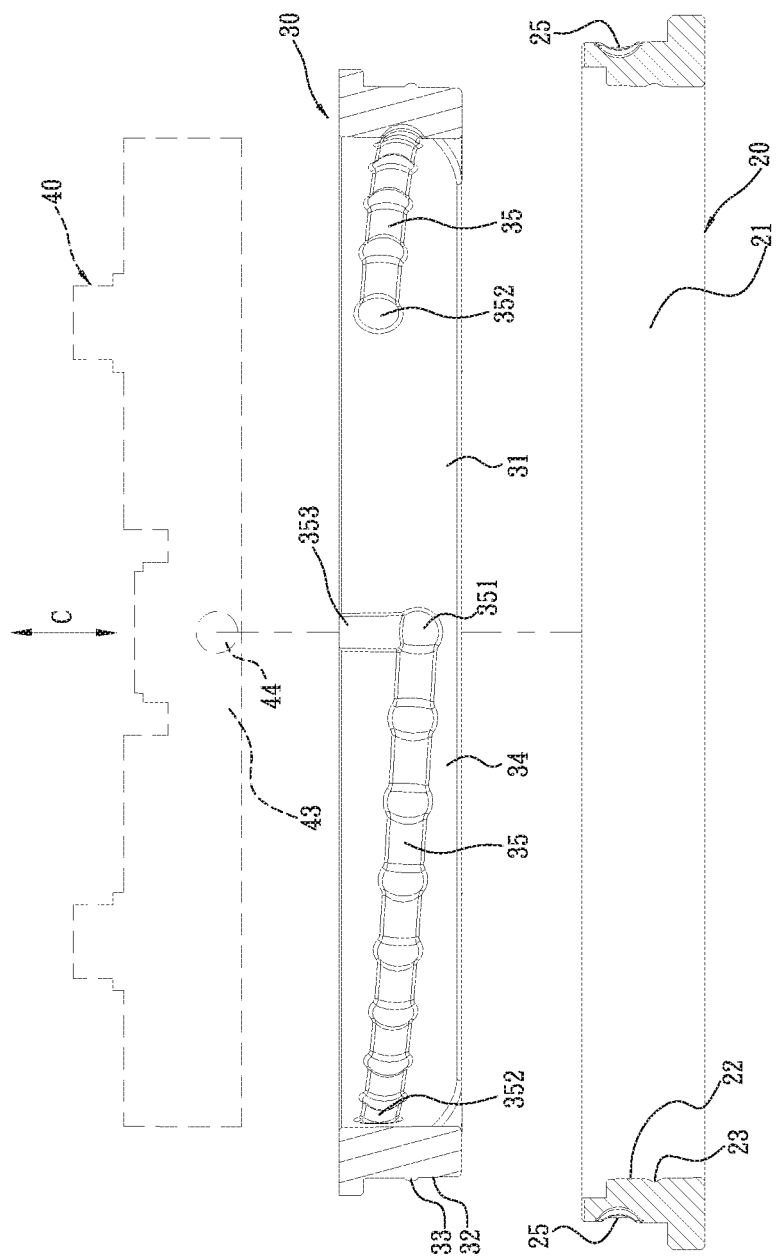
FIG. 7 is a side view of an outer ring, an inner ring and a disk of an embodiment according to the present invention.

Furthermore, refer to FIG. 4, at least one sloped inner slot 35, with a central angle and extended from a low point 351 to a high point 352, is set around an inner circular surface 34 of the central hole 31 of the inner ring 30. In this embodiment, three are three sloped inner slots 35 arranged with an equal interval between the two adjacent sloped inner slots 35, as shown in FIG. 5, FIG. 6 and FIG. 7 (only two sloped inner slot 35 are shown owing to the viewing angle). At least one short axle 44 is disposed on an outer circular surface 43 of the disk 40. In this embodiment, there are three short axles 44 arranged with an equal interval therebetween (only two short axles 44 are shown owing to the viewing angle) as shown in FIG. 5 and FIG. 6. The short axles 44 are mounted and moveable in the sloped inner slots 35 so that the inner ring 30 is able to be rotated an angle clockwise or counterclockwise relative to the disk 40 and the rotation angle of the inner ring 30 is limited in the central angle of the sloped inner slot 35. When the inner ring 30 is rotated clockwise or counterclockwise relative to the outer ring 20 and the disk 40 remains still without rotation (owing to a stopper set between the disk 40 and the outer ring 20 and used for preventing the disk 40 from rotating with the inner ring 30), the sloped inner slot 35 drives the disk 40 to move vertically relative to the inner ring 30, as the arrow C in FIG. 2 and FIG. 7 indicates. Thereby the height of the disk 40 relative to the inner ring 30 or the working surface 2 is adjusted or changed.

Figure 8:
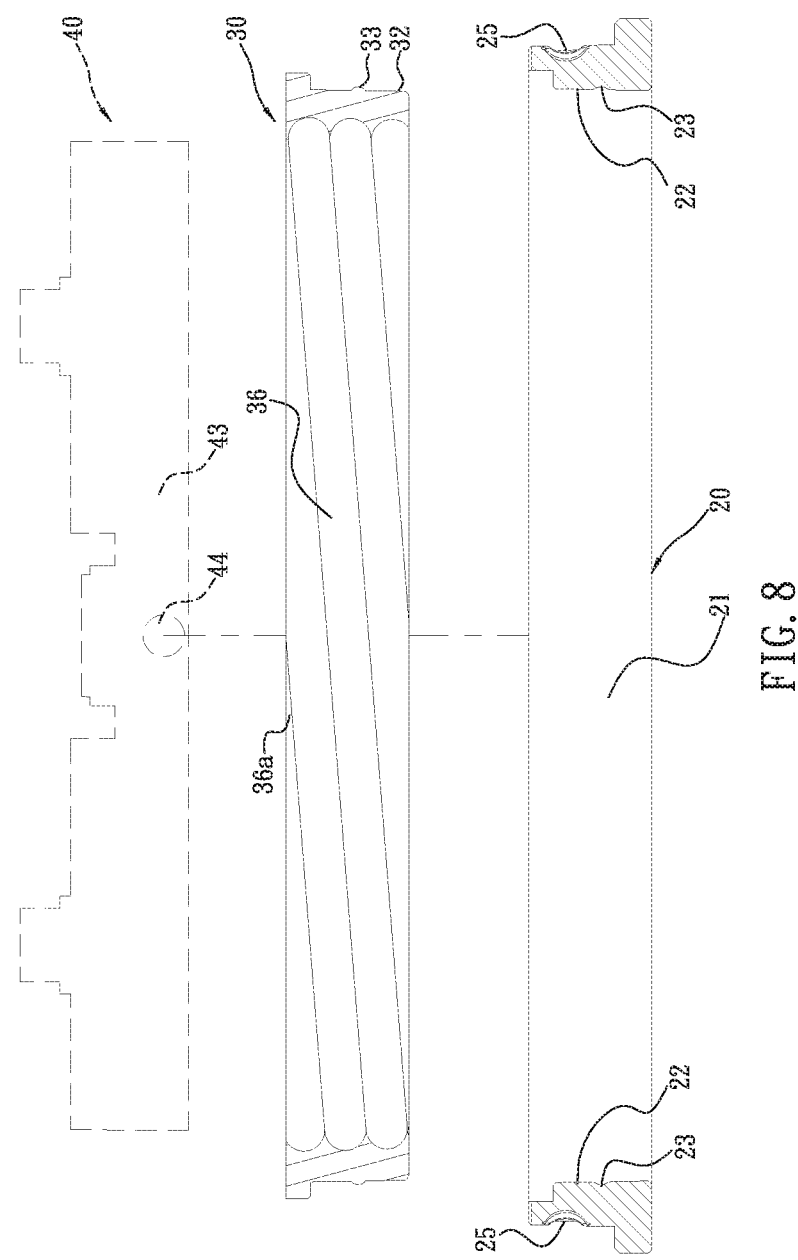
FIG. 8 is a side view of an outer ring, an inner ring and a disk of another embodiment according to the present invention.

The component that leads to horizontal rotation of the inner ring 30 for driving the disk 40 to move vertically is not limited to the sloped inner slot 35 shown in FIG. 7. Refer to FIG. 8, at least one inner thread 36 is used to replace the sloped inner slot 35. Two short axles 44 are disposed on intersections of the outer circular surface 43 of the disk 40 and a diameter of the disk 40 respectively and symmetrically. The short axles 44 are mounted in the inner thread 36. Thereby the disk 40 is driven to move vertically by the slope of the inner thread 36 of the inner ring 30 when the inner ring 30 is rotated clockwise/counterclockwise and horizontally relative to the outer ring 20 and the disk 40 remains still (without rotation relative to the inner ring 30). The disk 40 is set to move upward (away from the working surface 2) when the inner ring 30 is rotated clockwise and horizontally. The disk 40 is set to move downward (close to the working surface 2) when the inner ring 30 is rotated counterclockwise and horizontally.

For easy assembly, as shown in FIG. 6 and FIG. 7, at least one vertical channel 353 is set on the sloped inner slot 35 so that the short axle 44 on the outer circular surface 43 of the disk 40 can be mounted into the sloped inner slot 35 through the corresponding vertical channel 353. Refer to FIG. 8, similarly, at least one thread inlet 36*a* is arranged at the inner thread 36. Thus the short axle 44 of the disk 40 is mounted into the inner thread 36 through the thread inlet 36*a*.

In addition, back to FIG. 3, at least one bulge 26 is disposed on the outer surface of the outer ring 20. In this embodiment, there are two bulges 26. Thus users can easily operate the outer ring 20 to rotate relative to the round opening 13 by the bulges 26. Angular graduations 60 are arranged at the bottom surface 12 of the mouse body 10, close to a periphery of the outer ring 20 for indicating the rotation angle of the outer ring 20.

Additionally, as shown in FIG. 3, at least one projection 37 is arranged at the outer surface of the inner ring 30. In this embodiment, there are two projections 37. Thus users can easily operate the inner ring 30 to rotate relative to the outer ring 20 by the projections 37. Graduations 70 are set close to a periphery of the disk 40 for indicating the vertical movement of the disk 40. The vertical movement of the disk 40 means the amount of the height the disk 40 increased relative to the inner ring 30 when the inner ring 30 is rotated an angle relative to the outer ring 20. The amount of the height the disk 40 increased is set in advance according to the slope of the sloped inner slot 35 or the slope of the inner thread 36.

Compared with conventional techniques, the mouse with an adjustable sensing module according to the present invention has the following advantages:

(1) The present invention is only disposed with one sensing module. Yet not only the 1-dimensional height (Z-axis) of the sensing module relative to the working surface can be adjusted, the 2-dimensional angle (X-Y axis) of the sensing module relative to the computer screen can also be adjusted. Thus the present invention can be used more efficiently than the prior art (such as U.S. Pat. No. 8,850,093).

(2) The present invention only includes one sensing module. Thus the cost of the sensing module will not be increased, the structure is simple and the original software and hardware of the mouse circuit inside the mouse body have not to be modified significantly. This is beneficial to both manufactures and consumers.

(3) Consumers can perform one-dimensional (Z-axis) or three-dimensional (X-Y-Z axis) adjustment by easy operation. Thus the present invention is a popular product for consumers, especially for computer game players. As a gaming mouse, the present invention is more competitive on the market.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A mouse with an adjustable sensing module and operated on a working surface comprising:

a mouse body is disposed with a mouse circuit for executing functions of the mouse and a round opening on a bottom surface thereof;

an outer ring horizontally set on the round opening of the mouse body and having a penetrating central hole;

an inner ring having a central hole and horizontally rotatable in the central hole of the outer ring;

a disk having a sensing window on a surface thereof and being mounted in and vertically moveable in the central hole of the inner ring; the disk is moved vertically relative to the inner ring, without rotation when the inner ring is rotated clockwise or counterclockwise relative to the outer ring; thereby a height of the disk relative to the inner ring is changed; and a sensing arranged at an inner surface of the disk that is facing the round opening of the mouse body, and electrically connected to the mouse circuit in the mouse body so that the mouse circuit obtains at least one input signal from the sensing module that detects movement of the mouse body on the working surface through the sensing window;

wherein the disk is vertically moved relative to the inner ring, without rotation when the inner ring is rotated clockwise or counterclockwise relative to the outer ring horizontally; thus the sensing module and the sensing window are integrally moved along with the disk relative to the outer ring so as to change and adjust a height of the sensing module relative to the inner ring/or the working surface, and wherein the outer ring is mounted and rotatable horizontally in the round opening on the bottom surface of the mouse body; the outer ring is able to be rotated relative to the round opening; the inner ring and the disk are rotated an angle along with the outer ring integrally and synchronously so as to adjust an angle of both the sensing module and the sensing window relative to a computer screen when the outer ring is operated to rotate the angle relative to the round opening of the mouse body.

2. The device as claimed in claim 1, wherein at least one sloped inner slot having a central angle and extended from a low point to a high point is set around an inner circular surface of the central hole of the inner ring; at least one short axle is disposed on an outer circular surface of the disk and is mounted and moveable in the sloped inner slot; wherein the short axle of the disk is driven to move between the low point and the high point of the sloped inner slot by rotation of sloped inner slot of the inner ring so that the disk is moved vertically relative to the inner ring and the height of the disk relative to the inner ring/or the working surface is changed.

3. The device as claimed in claim 2, wherein three sloped inner slots are arranged at the inner circular surface of the central hole of the inner ring with an equal interval between the two adjacent sloped inner slots; three short axles are disposed on the outer circular surface of the disk with an equal interval between the two adjacent short axles; the short axles are mounted and moveable in the sloped inner slots correspondingly.

4. The device as claimed in claim 1, wherein at least one inner thread is disposed around an inner circular surface of the central hole of the inner ring; at least one short axle is arranged at an outer circular surface of the disk and is mounted and moveable in the sloped inner slot; two protruding pins are disposed on intersections of an outer circular surface of the disk and a diameter of the disk respectively and symmetrically; the protruding pins are mounted in the inner thread; the disk is driven to move vertically by a slope of the inner thread of the inner ring when the inner ring is rotated clockwise/counterclockwise and horizontally relative to the outer ring and the disk remains still.

5. The device as claimed in claim 1, wherein a guiding slot is disposed around an inner circular surface of the outer ring while a guiding protrusion is arranged around an outer circular surface of the inner ring; the guiding protrusion is mounted in and sliding horizontally in the guiding slot of the outer ring.

6. The device as claimed in claim 1, wherein at least one outer sliding groove having a central angle is disposed around an outer circular surface of the outer ring while at least one pin is arranged at an inner circular surface of the round opening of the mouse body and is mounted and moveable horizontally in the outer sliding groove of the outer ring correspondingly; thereby the outer ring is rotated an angle relative to the round opening of the mouse body and the angle is controlled to be within the central angle of the outer sliding groove.

7. The device as claimed in claim 6, wherein three outer sliding grooves are disposed on the outer circular surface of the outer ring with an equal interval between the two adjacent outer sliding grooves; three pins are arranged at the inner circular surface of the round opening of the mouse body with an equal interval between the two adjacent pins.

8. The device as claimed in claim 1, wherein graduations are set close to a periphery of the disk for indicating vertical movement of the disk; the graduation shows the amount of the increased height of the disk relative to the inner ring when the inner ring is rotated an angle relative to the outer ring.

9. The device as claimed in claim 1, wherein angular graduations are arranged at the bottom surface of the mouse body, close to a periphery of the outer ring for indicating an angle of the outer ring rotated relative to the round opening of the mouse body.

* * * * *